United States Patent [19]

Le Pechon

[11] Patent Number: 4,630,208
[45] Date of Patent: Dec. 16, 1986

[54] IDENTIFICATION OF BEACONS

[76] Inventor: Guy Le Pechon, 2 allee des Troenes, F-92330 Sceaux, France

[21] Appl. No.: 561,451

[22] Filed: Dec. 14, 1983

[30] Foreign Application Priority Data

Jan. 6, 1983 [FR] France .................... 83 00120

[51] Int. Cl.⁴ .................. G01C 21/00; G06F 15/50
[52] U.S. Cl. ..................... 364/443; 364/558; 434/4; 434/242
[58] Field of Search .............. 364/443, 578; 434/35, 434/37, 38, 39, 40, 41, 42, 43, 239, 240, 244, 242; 343/5 M

[56] References Cited

U.S. PATENT DOCUMENTS

| | | | |
|---|---|---|---|
| 3,054,998 | 9/1962 | Cooper et al. | 343/5 M |
| 3,484,738 | 12/1969 | Autrey | 364/578 |
| 3,517,108 | 6/1970 | McCarthy | 434/239 |
| 3,694,558 | 9/1972 | Eisenberg et al. | 364/443 X |
| 3,743,754 | 7/1973 | Eisenberg | 434/242 |
| 4,470,816 | 9/1984 | Marshall et al. | 434/43 X |
| 4,490,117 | 12/1984 | Parker | 434/35 |

FOREIGN PATENT DOCUMENTS 2128243 10/1972 France .
2319914  2/1977 France .

Primary Examiner—Felix D. Gruber
Attorney, Agent, or Firm—Browdy and Neimark

[57] ABSTRACT

Apparatus and method for aiding a navigator to identify a light pattern or beacon, comprising a microprocessor connected to a memory for storing beacon data in coded form, a keyboard for calling up codes from memory and a display unit simulating the light pattern or beacon for enabling comparison with an actual light pattern or beacon. The apparatus is particularly useful to the identification of maritime navigation marks such as light beacons.

11 Claims, 3 Drawing Figures

IDENTIFICATION OF BEACONS

BACKGROUND OF THE INVENTION

This invention relates to an apparatus for identification of light-wave emitters or, optionally, radio transmitters by simulation of their emission or transmission characteristics. More in particular, the invention relates to an apparatus for identification of light beacons or other light signals such as fixed buoys and lightships used particularly for maritime navigation, and of sound signals, for example, radio beacons.

It is known that when a ship is at sea at night, the navigator fixes its position from the angles at which he observes a certain number of light beacons, typically two or three, which he has previously identified. However, this identification can prove to be laborious and uncertain because there is great variety in light beacons in regard to their color, their periods, their rhythm, etc. Some of them are alike which can cause confusion, particularly when the navigator is tired, tensed or upset and/or in case of rough seas. Also, by day and by night, particularly during mediocre visibility, the navigator can fix the position of his ship from radio waves transmitted by a certain number of radio beacons, and the risks of erroneously identifying them is also present, for the same reasons as above.

DISCUSSION OF PRIOR ART

A device is already known from patent French Pat. No. 2,128,243 intended to aid in identifying a beacon by time measurement of its period, which consists in directing into the observer's ear, by a suitable sound transducer, sound beats whose period is one second. Thus, by counting the number of beats that he hears during observation of the beacon, the observer can determine the period of said beacon to thereby identify it. He can also concentrate on observing the beacon without having to consult the second hand of a watch or mentally reconstruct the beats of a second with greater or lesser accuracy. However, this device is disadvantageous because the observer's attention is lessened by the need to count the beats he hears. This is not desirable, particularly when observation conditions are difficult because of fatigue or rough seas.

An apparatus is also known from French Pat. No. 2 319 914 for identification of notable points on shore or close to a port, comprising binoculars so designed that one of the observer's eyes sees the shore or port notable points, for example, with a magnifying lens, and the observer's other eye sees photographic or motion picture images with a suitable projection device. This apparatus is designed particularly to guide the navigator when the phase of approaching port, etc, must follow an established course, for example, a channel, and consequently the shore side of the channel must exhibit a particular appearance. However, the system has two major drawbacks. On the one hand, it becomes very complicated when it is desired to give the observer time data, for example, the rhythm and period characteristics of a light beacon. Consequently, it is necessary to resort to projection of motion picture images. In this connection, it should be noted that this device does not describe any means for making this motion picture apparatus. Further, it is found that this patent is not concerned with the indication of the color or period or rhythm of the light beacons, because it resorts to images taken during the day, or to indications relating to radio beams, because the only sound data considered in the patent relates only to the texts accompanying the images.

SUMMARY OF THE INVENTION

This invention aims at avoiding the drawbacks mentioned above and at an apparatus for identification of light and, optionally, sound signals making it possible to keep the observer from having mentally to perform a time simulation or count, at the same time as the observation, to enable him to concentrate completely, which is essential, particularly when observation conditions are difficult.

The invention further aims at apparatus making it possible more especially to identify a light or radio beacon without there being any ambiguity about the identification.

For this purpose, this invention relates to an apparatus for identification of light and/or sound marks by simulation, characterized in that, in a general way, it comprises means to superpose on the visual or aural observation of a particular mark a reconstruction.

BRIEF DESCRIPTION OF THE DRAWINGS

The invention and its various particular characteristics will be better understood from a reading of the following description of a nonlimiting embodiment according to the invention given with reference to the accompanying drawings, in which.

DETAILED DESCRIPTION

Figure 1:
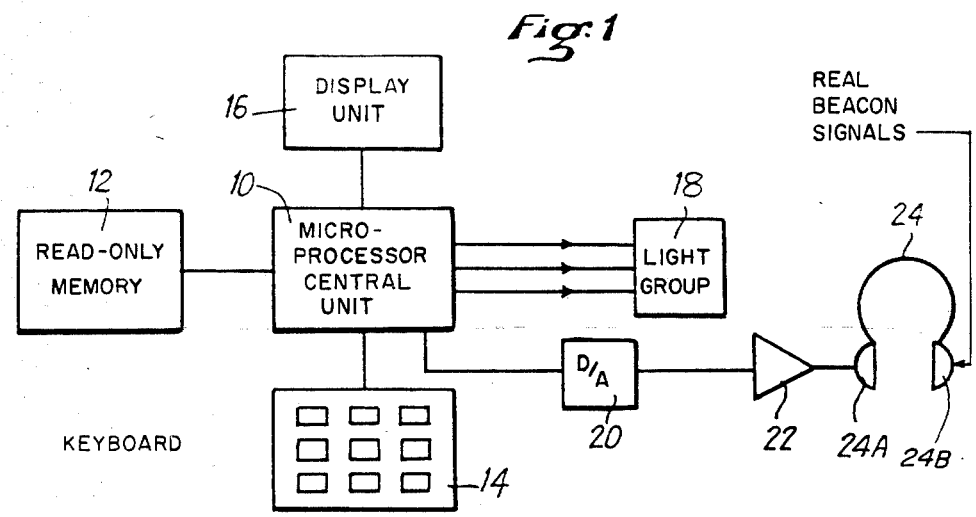
FIG. 1 is a block diagram of an apparatus according to the invention.

The apparatus shown in a block diagram in FIG. 1, comprises a microprocessor central unit 10 to which is connected a read-only memory 12 containing all the digitally coded data relating to light and radio beacons of a particular maritime region. Memory 12 is designed to be interchangeable, for example, by plugging into a connector (not shown) or unplugging from it so as to be able to store in the apparatus the data relating to the light and radio beacon of a selected region, then to change the memory by plugging into another data block to obtain the beacons of another region. This data can be updated yearly either by replacing the read-only memory 12 or by modification of its content. The apparatus further comprises a keyboard 14 enabling the user to call up a particular light or radio beacon by suitable pressures on the keys.

After said call-up, central unit 10 will show on a display unit 16, consisting of known suitable indicators making representation in alphanumeric characters possible, the name of the beacon and optionally its registration, its characteristics, etc. If it is a light beacon, central unit 10 will deliver actuating voltage to a group of lights 18 making it possible to turn on or off particular lights (not shown) of the block of lights 18 to simulate by this light or lights the color, period and rhythm of the light beacon called up by keyboard 14. When it is a radio beacon, the central unit will deliver to a digital-analog converter 20 digital data which, on being converted, will restore by an amplifier 22 and left earphone 24A of a headset 24 the sounds corresponding to the transmission characteristics of the radio beacon that has been called up. These sounds can be emitted simultaneously or alternately with that of the real radio beacon.

Thus, thanks the apparatus described above in a summary way, the user has available, by a simple call-up on the keyboard, either a visual or sound simulation of the characteristics of a mark by a simple visual or aural comparison, therefore with great certainty, without his concentration being affected by a mental counting or by sound beats.

Figure 2:
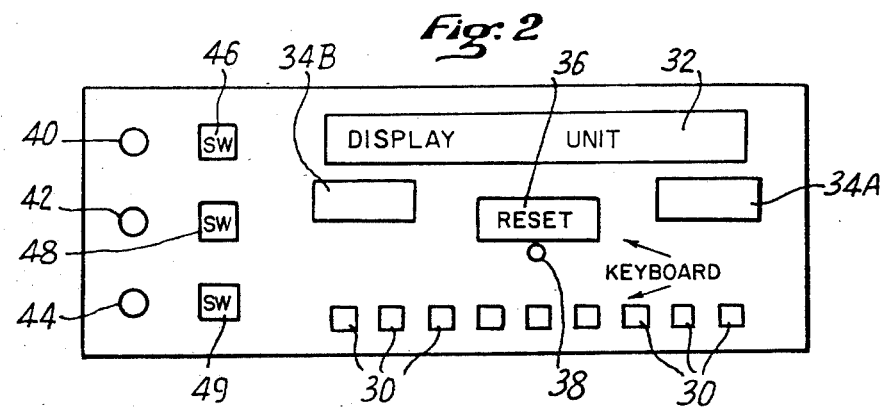
FIG. 2 is a front view of the front face of the apparatus of FIG. 1.

FIG. 2 shows the front face of the apparatus of FIG. 1, which comprises a series of keys 30, corresponding to keys 14 of FIG. 1, intended to make possible the call-up of a selected light or radio beacon either by its name or the first letters of its name or a suitable code number. After call-up, the name of the beacon and, optionally, a part or all of its characteristics are shown on a display unit 32. The apparatus further comprises two keys 34A and 34B intended, by simple pressure on one of them, to call up a nearby beacon in a given direction, for example, east or west, by suitable increment or decrement, to the extent that the data on the beacon is arranged in memory in a suitable geographic order. The apparatus further comprises a reset key 36 which enables the user, when he observes a beacon, to start the beginning of the simulation by pressing said key 36, to synchronize the start of the simulated beacon period with the start of the real beacon period and so that the comparison can be made in real time. A light 38 or a sound indicator is associated with said reset system and emits a short light blip or sound beep at the beginning of each period.

This example shows three lights 40, 42, 44 connected to a central unit whose respective white, green and red colors make it possible to simulate beacons having these colors and three switches 46, 48, 49 that are respectively associated with lights and whose use will be seen below.

Figure 3:
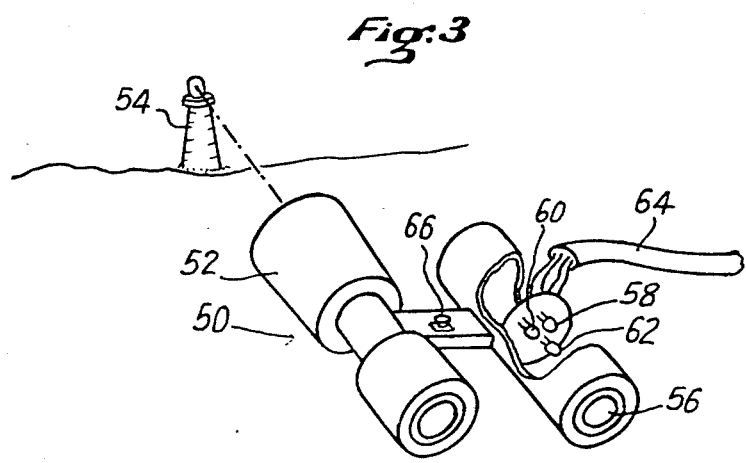
FIG. 3 shows a perspective view of a sighting device which optionally can be associated with the apparatus of FIGS. 1 and 2.

Finally, FIG. 3 shows a sighting device associated with the apparatus according to the invention which, for example, comprises binoculars generally indicated by reference number 50. The binoculars comprise a magnifying lens 52, associated with the left eye, making it possible to sight and observe a beacon 54. The other eye is associated with an eyepiece 56 making possible the observation of lights 58, 60, 62 located on the inside of the sighting device and connected by a multistrand cable 64 and a suitable connector (not shown) to the apparatus shown in FIGS. 1 and 2. As above, the respective colors of the lights are white, green and red. Lights 58, 60 and 62, connected in parallel with lights 40, 42, 44 of FIG. 2, have the same role as these latter. Also on the housing of the sighting system is a key 66 whose function is in identical in every detail with that of key 36 of FIG. 2.

Functioning of the apparatus of the invention, is further described in detail with reference to FIGS. 1 to 3. When the navigator's ship approaches a shore at night and one or more beacons can be observed, the navigator will be able to guess which beacon or beacons are involved, depending on his estimated course. With keyboard 14 keys 30, he calls up one of these beacons so that the central unit will send to the light or lights involved the voltage making it possible to restore or simulate the time maneuvers of said beacon. Then with the sighting device shown in FIG. 3, he observes the beacon he assumed to correspond to the beacon he has called up. Thus, with his left eye the observer will observe the light emission from the beacon and, with his right, the simulation of said beacon, with at least one of lights 58, 60, 62 which he can optionally reinitialize with key 66 so that the beginning of its period corresponds with that of the observation. Thus, thanks to the invention, the observer can identify said beacon with certainty, without particular mental exertion, counting or the like, by simple visual comparison of what his two eyes observe. This identification is acquired with certainty even if observation conditions are laborious (fatigue, rough seas, etc), and in a very short time. Further, when the beacon to be identified is in sectors, i.e., its color varies according to the angle at which it is observed, then the central unit will simultaneously trigger no longer one but two or three lights, and the observer, depending on the color he observes, will turn off, by switches 46, 48, 49 associated respectively with the front face of each of the lights, those that do not correspond to the color observed.

Further, when the navigator wants to fix his position by night or day with a radio beacon, the process is similar. By call-up on the keys, he will hear in the left earphone 24A of headset 24 the Morse code corresponding to the radio by a goniometer (not shown) to which said earphone is connected. Identification will be made in the same way by an aural comparison between a signal observed by radio and a simulated signal. In this connection, it is advantageous that the frequency of the signals delivered by the apparatus of the invention be different from the frequency of the signals picked up, so that the distinction and comparison between the code received and the code simulated can be made without ambiguity.

This invention is not limited to the embodiment described. In particular, the call-up keyboard can be a standard alphanumeric keyboard, which will make it possible to call up a beacon by the first letters of its name. The display unit can consist of a cathode ray tube which will make it possible to provide the navigator with considerable data, for example, the list of a certain number of beacons, color or again the characteristics of sectors of a beacon having sectors, etc. Also, the software associated with the central unit can exhibit any degree of sophistication, from the simplest to the most complex. The memory containing data on light and radio beacons can be interchanged either by unplugging, as described above, or by loading therein the contents of disc or tape digital memories.

Further, the bulbs can be any number. Only a single light can be provided on the simplest apparatus or, conversely, up to 6 lights of different colors on more complex apparatus.

On the other hand, according to a variant, it is possible to provide in the apparatus of FIGS. 2 and 3 several series of lights (40 to 44 and 58 to 62) and several series of switches (46 to 49), for example, two series each, when the visual observation is made on light beacons (for example, two) in alignment; the highest of the light beacons in relation to sea level being simulated by the upper series of lights.

Finally, according to another extension of the invention, it is possible to identify the light or sound signals automatically. For example, instead of using the human eye with binoculars or the like, it is possible to provide a light sensor with an amplifier in the sighting device, then make the automatic comparison with the various signals generated by the apparatus in the geographical considered area, in order to gain the selection of the signal corresponding to the one observed.

The invention also applies to and is entirely suitable for teaching navigation, and will allow future navigators to learn to recognize light and sound beacons.

While the invention has been described in detail above, it is to be understood that this detailed description is by way of example only, and the protection granted is to be limited only within the spirit of the invention and the scope of the following claims.

What is claimed is:

1. Apparatus for aiding a navigator to identify a light pattern such as of a beacon, particularly for navigation purposes, comprising
   memory means containing data relating to light beacons of a region including data on the light patterns of beacons;
   means to call up and simulate the light pattern of a particular beacon from said memory means; and
   means to enable comparison of the light patterns from a beacon with the data on simulated light patterns called up from said memory means.

2. The apparatus of claim 1, wherein said enabling means comprises
   a binocular device having
   a means to receive light patterns from a beacon in one barrel of said binocular device;
   and means for showing called up simulated light patterns in another barrel of said binocular device, connected to said call up means.

3. The apparatus of claim 2, wherein
   said showing means includes
   colored light means blinking in the same rhythm as the light beacon.

4. The apparatus of claim 1, wherein
   said call up means includes
   a microprocessor central unit,
   said memory means includes
   a memory containing data on the color, rhythm and period of at least one beacon connected to said microprocessor central unit; and
   said enabling means includes
   at least one light connected to said central unit to receive voltages to operate said light in accordance with said memory.

5. The apparatus of claim 4, wherein
   said memory includes data on a plurality of beacons;
   and keyboard means are connected to said central unit;
   said keyboard means having key means to direct a search of said memory for the closest beacon in a given direction.

6. The apparatus of claim 1, wherein said enabling means includes
   means to reset the initiation of said simulation means to coincide with the initiation of a period of a light signal received from a light beacon.

7. A method for enabling the comparison of light patterns from a beacon with simulated light patterns comprising the steps of
   storing data relating to a plurality of light patterns simulating light patterns of beacons;
   calling up data on at least one of the stored simulated light patterns of beacons;
   enabling comparison of the light patterns from a beacon with the called up stored simulated light patterns
   whereby an observer of a light beacon is enabled to identify the light beacon by comparison of the pattern of the light beacon with a stored pattern.

8. The method of claim 7 enabling the comparison of light patterns from a beacon with simulated light patterns further comprising
   directing the pattern of the light beacon to one eye of a human observer; and
   directing the simulated light pattern to the other eye of the human observer.

9. The method of claim 7 enabling the comparison of light patterns from a beacon with simulated light patterns further comprising
   changing the simulated light pattern to another pattern stored in memory until, in the step of enabling comparison, a similarity of patterns is reached.

10. The method of claim 7 enabling the comparison of light patterns from a beacon with simulated light patterns further comprising
    in said step of enabling comparison, arriving at a similarity of rhythm, period, and color of said sighted light pattern and said simulated light pattern.

11. The method of claim 7 enabling the comparison of light patterns from a beacon with simulated light patterns further characterized by
    resetting the initiation of the step of simulating of a light pattern to coincide with the period of the pattern of the sighted light beacon.

* * * * *